United States Patent Office 2,758,616
Patented Aug. 14, 1956

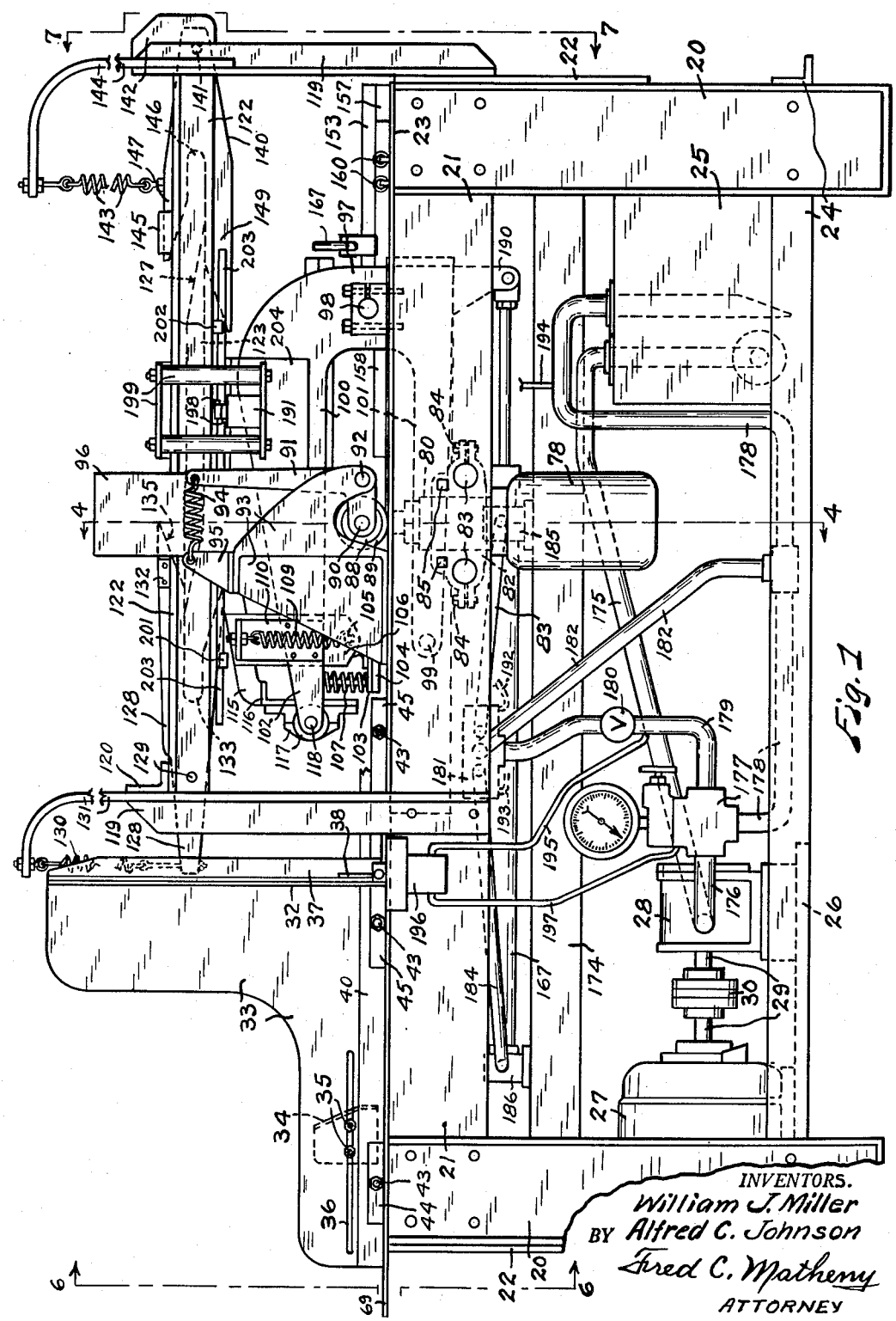

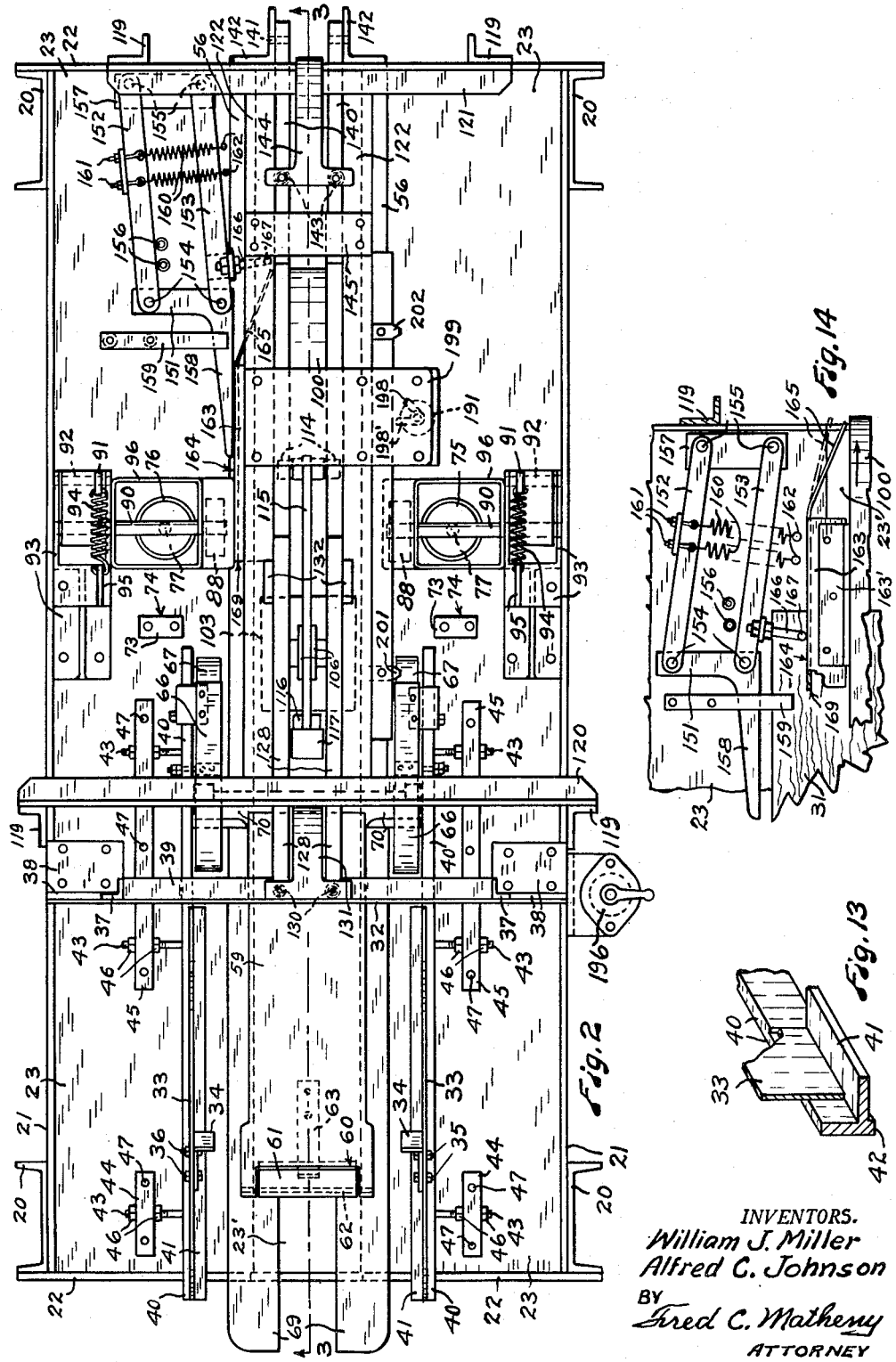

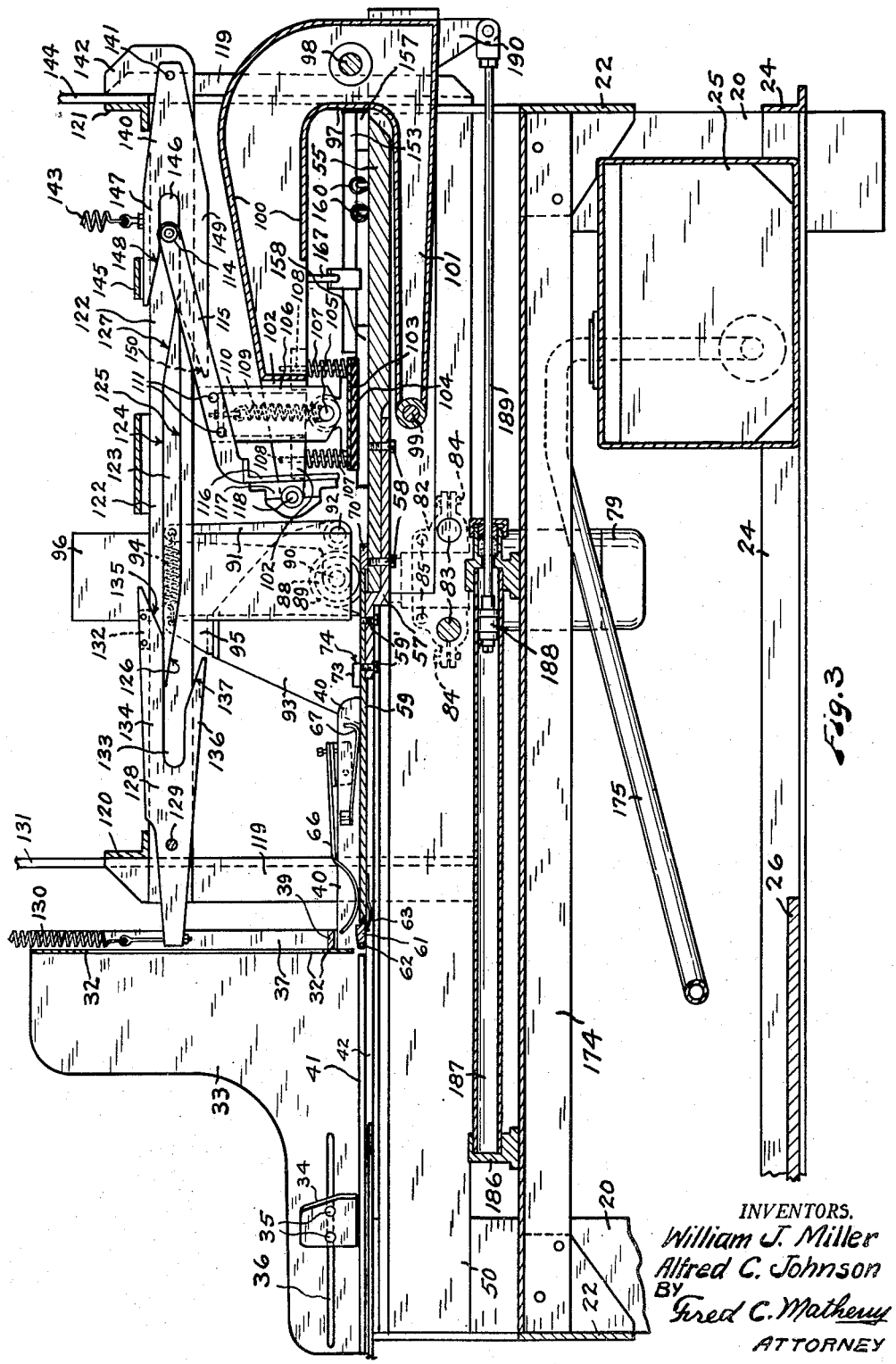

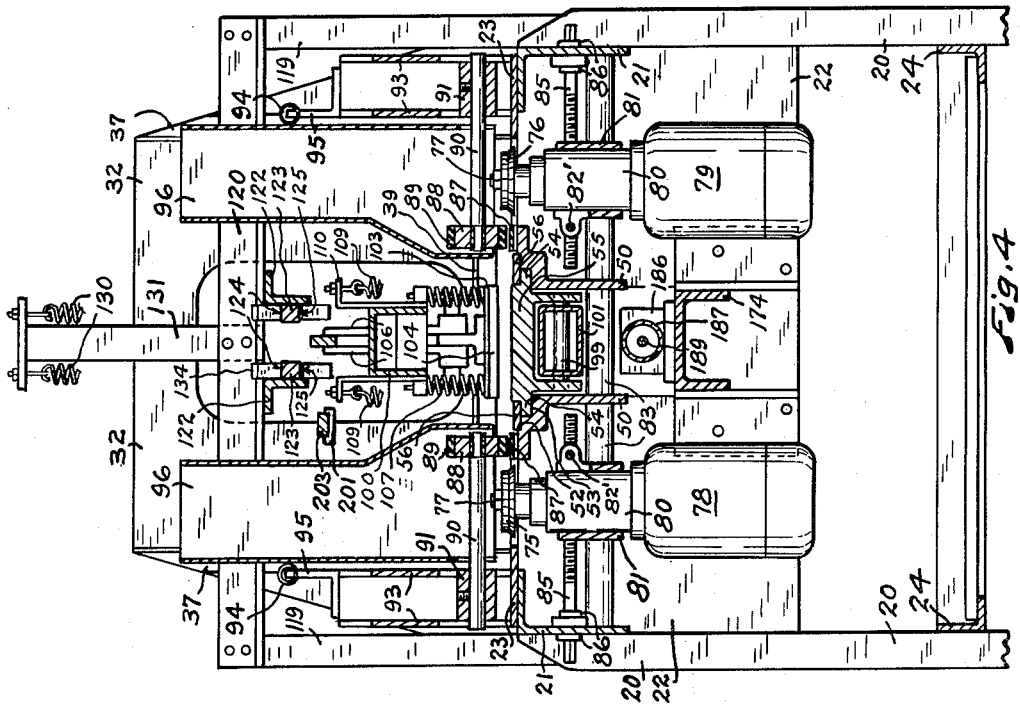
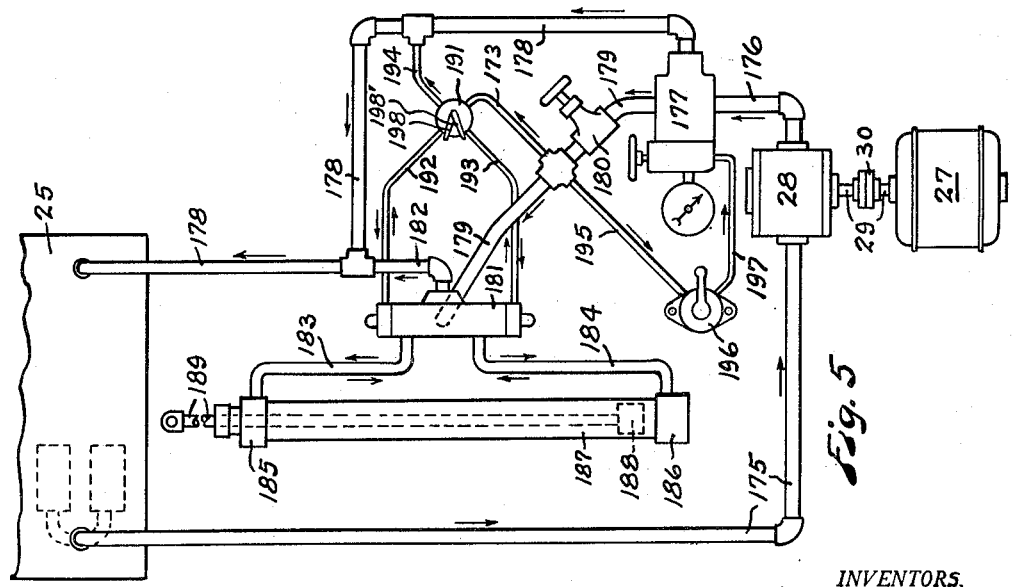

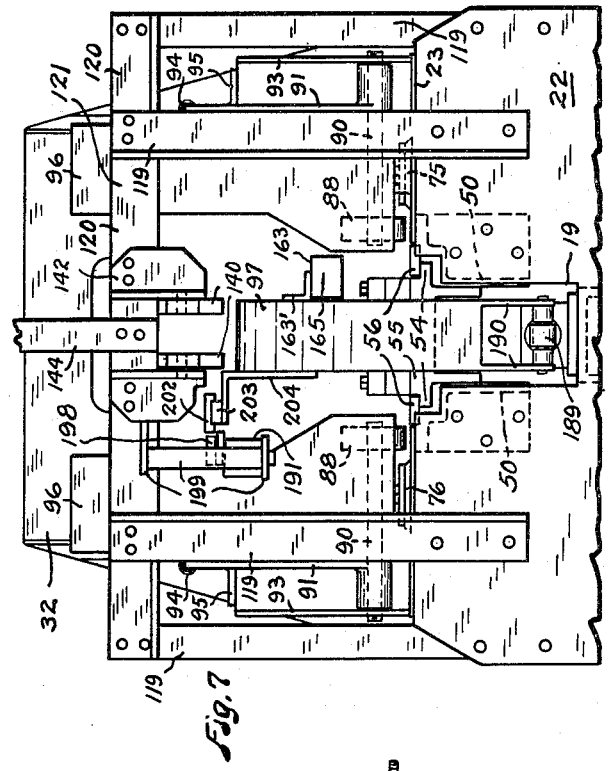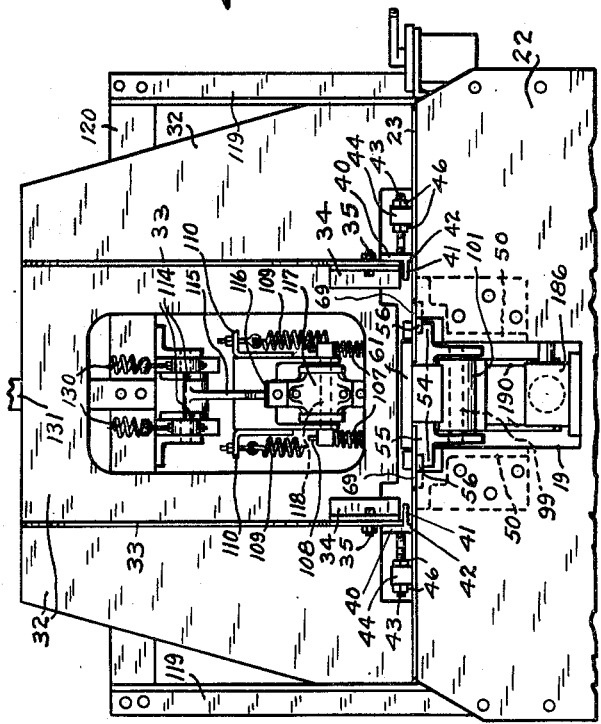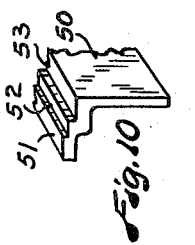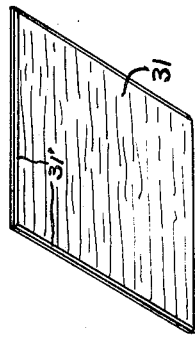

2,758,616

MACHINE FOR EDGE TRIMMING, SIZING, AND SQUARING FLAT PANELS

William J. Miller and Alfred C. Johnson, Seattle, Wash., assignors to Elliott Bay Mill Co., Seattle, Wash., a corporation of Washington Application April 7, 1953, Serial No. 347,198

8 Claims. (Cl. 144—2)

This invention relates to a machine for edge trimming, sizing and squaring flat panels and an object of this invention is to provide a machine of this type which is particularly well adapted for edge trimming, sizing, squaring and edge beveling small plywood panels which are made from wood veneer.

Another object of this invention is to provide a machine of this type which is capable of high speed operation and is extremely accurate in sizing and squaring the panels.

Another object is to provide a new method of sizing and squaring panels by first feeding the panels between two driven rotary tools to trim two opposed edges of the panels, then rotating the panels through an angle of ninety degrees and again feeding them between the same two rotating tools to accurately size and square the panels.

In the manufacture of plywood from wood veneer it is common practice to make up the plywood in sheets of relatively large size, such as four by eight feet. It often happens that these large sheets will have small defects which it is not practical to patch or correct and thus the entire sheet is rendered defective and must be classified as a "reject" although the major portion of the sheet may be good.

It is an object of this invention to provide a machine which will facilitate the use of a large proportion of the good plywood in each "reject" sheet for high grade work by making it possible to cut this good plywood up into small, high grade, accurately sized and squared panels suitable for finishing walls, ceilings and the like. Such panels ordinarily will be edge beveled on one side. These panels, usually from twelve to twenty-four inches square, must be of uniform size and accurately squared so that they will be interchangeable and will fit together accurately without leaving cracks or offset joints irrespective of how they are positioned or turned for the purpose of securing pleasing design effects by varying the relative position of the grain of the wood in adjoining panels. The panels are first roughly sized and squared, as by sawing, and are left a little oversize so that a final sizing and squaring and edge beveling may be accurately done in this machine to insure perfect matching of the panels.

Another object of this invention is to provide a panel edge trimming, sizing and squaring machine in which each roughly sized and squared panel is passed through the machine twice and has two opposite edges accurately and uniformly edge trimmed on the first trip through the machine and the other two opposite edges accurately and uniformly trimmed exactly at right angles to the first trimmed edges on the second trip through the machine.

Another object of the invention is to provide highly efficient means for holding and guiding panels while they are being moved past rotatively driven edge trimming tools, whereby the panels are very accurately sized and squared.

Another object of the invention is to provide efficient means for quickly discharging the panels transversely of their direction of travel after they have passed the edge trimming tools.

Another object is to provide a panel sizing, edge trimming and squaring machine which makes it possible to handle the panels in superimposed or stacked relation.

Other objects of the invention will be apparent from the following description taken in connection with the accompanying drawings.

Figure 1 is a side elevation of a machine constructed in accordance with this invention.

Fig. 2 is a plan view of the same.

Fig. 3 is a longitudinal sectional view, with parts in elevation and parts omitted, taken substantially on broken line 3—3 of Fig. 2, a carriage and parts connected therewith being shown in a different position than they are in Figs. 1 and 2.

Fig. 4 is a cross sectional view, with parts in elevation, taken substantially on broken line 4—4 of Fig. 1.

Fig. 5 is a schematic view illustrating hydraulic carriage reciprocating mechanism embodied in the invention.

Fig. 6 is a fragmentary end elevation looking in the direction of broken line 6—6 of Fig. 1, parts being broken away.

Fig. 7 is a fragmentary end elevation looking in the direction of broken line 7—7 of Fig. 1, parts being broken away.

Fig. 8 is a perspective view of a panel which has been edge trimmed and beveled by this machine.

Fig. 9 is a fragmentary sectional view showing a plywood panel which has been edge trimmed and beveled by this machine.

Fig. 10 is a detached fragmentary perspective view of track means used in this machine to support a movable carriage.

Fig. 11 is a detached fragmentary sectional view, on a larger scale than Fig. 3, illustrating the operation of panel feeding means which is also shown in longitudinal section in Fig. 3.

Fig. 12 is a detached plan view of a straight edge member and extractor plate embodied in the panel feeding means.

Fig. 13 is a detached fragmentary perspective view, with parts in section, showing panel supporting and guiding means used in connection with a panel hopper at the intake end of the machine.

Fig. 14 is a detached fragmentary plan view showing panel ejecting or kick-out means used at the discharge end of the machine.

Like reference numerals designate like parts throughout the several views.

This panel edge trimming, sizing and squaring machine comprises frame means including upright legs 20, longitudinally extending table supporting angle bars 21 secured to the upper end portions of the legs 20 and relatively wide end plates 22 secured to the legs 21 and extending crosswise of the machine at the respective ends thereof. The end plates 22 have their top edges substantially flush with the top edges of the angle bars 21 and horizontal table plates 23 are supported by the angle bars 21 and end plates 22. The table plates 23 extend lengthwise of the frame along the respective sides of the same and are of suitable width to leave a longitudinally extending opening 23', Figs. 2 and 14, in the table top mid way between the two sides thereof. This opening 23' facilitates the operation of longitudinally movable carriage means hereinafter described. The end plates 22 have downwardly extending notches 19 which register with the opening 25' between the table plates.

Angle bars 24 are secured to the legs 20 near the lower ends of these legs and serve as brace means for the legs and support means for a hydraulic tank 25 and platform 26. A motor 27 and pump 28, Fig. 1, are carried on the platform 26 and are connected for driving purposes by shafts 29 and a flexible coupling 30. Parts 27, 28, 29 and 30 are omitted in Figs. 3 and 4.

The intake end of the machine is shown at the left and the discharge end at the right in Figs. 1, 2, and 3. Where the terms left and right are used in the following description they refer to these directions, as shown in Figs. 1, 2, and 3.

Roughly sized and squared panels which are to be accurately squared and sized and beveled are supplied in superimposed or stacked relation to the intake end of the machine and these panels are successively removed one at a time from the bottom of the stack and fed through the machine, as hereinafter described.

Guide means to receive the stacked panels and herein referred to as a hopper is provided above the table plates 23 at the intake end of the machine. This hopper means includes an upright front plate 32, Figs. 1, 2, 3, 6, 7 and 11, and two transversely spaced apart side plates 33 shaped somewhat like a letter L in side elevation. Two inclined guide members 34 are adjustably secured to the side plates 33 by bolts 35 which operate in slots 36 in the side plates 33. The front plate 32 is supported by two upright angle bars 37 and has its lower edge spaced a short distance above the table plates 23. The angle bars 37 are welded or otherwise rigidly secured to two angle shaped base plates 38, respectively. The two base plates 38 are rigidly secured to the table plates 23. Preferably a flat front plate reinforcing bar 39, Figs. 2 and 3, is rigid with the upright angle bars 36 and extends across the rear side of the front plate 32 a short distance above the bottom edge of said front plate. The reinforcing bar 39 may be welded to the front plate 32.

The L-shaped side plates 33 are supported by two transversely spaced apart horizontal parallel bars, Figs. 2, 3, 6 and 13, of L shaped cross section. Each of these bars comprises an upright flange 40, a horizontal flange 41 and a foot portion 42 which rests on the table plates 23. These bars 40, 41, 42 are supported for transverse adjustment by bolts 43. The bolts 43 extend through blocks 44 and 45 and are adjustably connected with these blocks by nuts 46. The blocks 44 and 45 are positioned outwardly from the angle bars 40 and are rigidly secured to the table plates 23, as by rivets 47, Fig. 2. The horizontal flanges 41 of the angle bars are inwardly directed to provide panel supporting means. The flanges 41 terminate substantially at the plane of the front side of the front plate 32, see Figs. 2 and 13, and the upright flanges 40 extend beyond the front plate 32 and are flush with the inside surfaces of the side plates 33 and serve as side guides for the panels 31, shown in Figs. 8, 9 and 11. The hopper can be adjusted for panels of different size by moving the sides 33 transversely and the members 34 longitudinally of the machine.

The lowermost panel 31 in a stack rests on the flanges 41 and is supported a short distance above the plane of the table plates 23 so that reciprocable carriage means may pass thereunder, as hereinafter described.

Two parallel, spaced apart track members 50 of duplicate construction and of a cross sectional shape shown in Figs. 4, 6, 7 and 10, extend lengthwise from end to end of the machine approximately midway between the two sides thereof and are rigidly attached to the end plates 22. The outwardly directed upper flange portions of the track members 50 have flat upper surfaces 51 flush with the lower surfaces of the table plates 23 and have shallow rabbet grooves 52, Fig. 10, inwardly from the surfaces 51 and deeper rabbet grooves 53 inwardly from the shallower grooves 52. The deeper rabbet grooves 53 slidably receive track flanges 54, Fig. 4, of a reciprocable carriage member 55. This carriage member 55 is shown in a retracted position in Fig. 3 and in an advanced or panel receiving position in Figs. 1 and 2 and in an intermediate position in Fig. 11. Hold down plates 56, Figs. 2, 4 and 6, are disposed within the shallower grooves 52 and secured to track members 50 and overhang the flanges 54 of the carriage member 55. Preferably the hold down plates 56 extend throughout the length of the machine. Also preferably two cover plates 69, Fig. 1, overlie the hold down plates 56 at the intake end portion of the machine.

A bracket 57, Figs. 3 and 11 is secured by bolts 58 to the forward end portion of the carriage 55, this being the end portion of the carriage 55 shown at the left in Figs. 3 and 11. A reciprocably movable extractor plate or feed plate 59 is secured by bolts 59' to the bracket 57. Obviously the extractor plate 59 is, in effect, a part of the reciprocating carriage member and can be made integral with the part 55. However, this extractor plate is preferably separately constructed and is made of smoothly surfaced brass to operate smoothly and with the least possible friction against the surfaces of the panels 31. The extractor plate 59 is widened at its forward end and has a notch 60 therein. A panel engaging pawl 61, Figs. 2, 3, 11 and 12, is disposed within the notch 60 and pivotally connected with the extractor plate 59 by a pivot pin 62. A spring 63 yieldingly urges the non-pivoted end portion of the panel engaging pawl 61 upwardly into the panel engaging position shown in Fig. 11. A flange 64 on the non-pivoted end portion of the panel engaging pawl engages beneath another flange 65 on the adjacent end portion of the extractor plate 59 and limits upward movement of the panel engaging end portion of the pawl 61. The top surface of the extractor plate 59 is positioned in a plane a slight distance below the plane of the bottom surface of the lowermost panel 31 of the stack and is adapted to move under the stack of panels as the carriage moves to the left. The pawl 61 is depressed by the lowermost panel as it moves under the stack and snaps up into panel engaging position as soon as it has moved past the outermost edge of the lowermost panel. Then, as the extractor plate 59 moves toward the right the lowermost panel 31 is moved to the right under the adjacent lower edge of the front plate 32 until it is clear of the stack and clear of the panel supporting flanges 41. It will be noted that the central portion of the front plate 32 is cut away, as shown in Figs. 3, 4, 5 and 6 to provide better visibility of the panels in the hopper.

As a panel 31 is moved to the right from under the stack in the hopper it passes under preferably two sets of hold down springs 66 and 67 which are positioned adjacent the respective lateral edges of the advancing panel. After passing off of the flanges 41 the panel rests on the extractor plate 59 and the springs 66 and 67 yieldingly hold said panel down. Upon reversal of the direction of movement of the extractor plate 59, that is when said plate 59 begins to move to the left, the panel resting thereon and held down by springs 66 and 67 may move back against the lower panel of the stack but can not move back any further and the extractor plate 59 and straight edge member 70 at the right end of said extractor plate 59 will slide under this previously advanced panel until the straight edge 70 passes beyond the left edge of the panel and the panel drops down in front of the straight edge 70 and rests on the carriage 55, as shown in Fig. 11.

Two panel engaging elements 71 are provided adjacent the respective end portions of the straight edge member 70 on the panel engaging edge thereof. Between the elements 71 the panel engaging edge of the straight edge member 70 is preferably relieved or cut back so that it will not touch the panel. The panel engaging elements 71 are in a common plane which is exactly at right angles to the direction of travel of the panels and this insures the production of very accurately squared panels because the lateral edges of an advancing panel will always be trimmed at exactly right angles to the edge thereof which rests against the elements 71. Preferably the overhanging end portions of the straight edge member 70 have bevels 72 provided on the edges thereof opposite the elements 71 so that the straight edge member 70 will not catch on the edges of panels as it is moved under the stack of panels in the hopper.

The panel engaging surfaces of the elements 71 require checking and truing up at intervals in the operation of the machine. This checking and truing up is facilitated by providing on the table plates 23, at the sides of the path of travel of the panels, two gauge blocks 73, Fig. 2, which are rigidly and permanently attached to the table so that the common plane of their faces 74 is exactly at right angles to the path of travel along which the panels are guided and moved. The accuracy of the panel engaging surfaces of the elements 71 is checked by laying a true and accurate straight edge against the faces 74 of the gauge blocks 73 and moving the elements 71 up against this straight edge. If only one of the elements 71 contacts the straight edge then the face of this element 71 is dressed off enough so that both elements 71 will contact the straight edge evenly and squarely and this accurately aligns the elements 71 so that they will support the panels in the correct positions to insure a uniform, accurate and exact squaring of said panels.

Each time the extractor plate 59 is moved to the left the pawl 61 engages a new panel and the straight edge member 70 engages a previously advanced panel. Then on the next excursion of the carriage 55 to the right the member 70 will move the previously advanced panel between and past two rotatively driven cutter head type tools 75 and 76 and the two lateral edges of the panel will be accurately trimmed by the tools. Preferably the tools 75 and 76 are shaped to provide a bevel 31' on the panels, as shown in Figs. 8 and 9. As the distance between the tools 75 and 76 is always maintained constant the panels will always be accurately sized when they pass between these tools. Usually a stack of panels which have previously been roughly sized and squared but are at least slightly oversize will be run through the machine and stacked at the discharge end as they come out. This stack will then be put back in the hopper after being rotated ninety degrees so that the panel edges which were at the front and rear on the first trip through the machine will be at the sides on the second trip and will be edged to exactly the same size and exactly at right angles to the two first trimmed edges.

The rotatively driven cutting tools 75 and 76 are carried on the upright shafts 77 of two motors 78 and 79. Each motor has a hub 80 which is securely clamped within a cylindrical part 81 of a bracket 82. Each cylindrical bracket part 81 is split and is adapted to be clamped on its motor hub 80 by screws 82', Fig. 4. This provides for vertical adjustment of the rotatively driven tools 75 and 76. Each bracket 82 is mounted on two transverse parallel rods 83 provided on opposite sides of the motor hubs 80. The rods 83 are fixedly supported from the frame bars 21 and track members 50. Each bracket 82 is split as respects the part which fits over the rods 83, see dotted lines Figs. 1 and 3, and is adapted to be securely clamped on the rods 83 by cap screws 84.

Two adjusting screws 85, Fig. 4, are threaded through each bracket 82 and extend outwardly through the frame bars 22 and have squared outer ends by which they may be turned. Collars 86 are rigidly mounted on each adjusting screw 85 adjacent the frame bars 22 to prevent longitudinal movement of the screws 85 so that turning of the screws will transversely adjust the motors and edge trimming tools 75 and 76.

A flat chromium plated shoe 87, Fig. 4, is supported on each table plate 23 just inwardly from and adjacent to each tool 75 and 76. A panel hold down roller 88 is operatively disposed above each shoe 87. Each panel hold down roller has a relatively thick peripheral portion or tire 89 of firm but resilient material, such as fairly firm rubber. The shoes 87 and rollers 88 cooperate in firmly holding and accurately positioning the panels and this holding force is applied adjacent the location where the panels are engaged by the edge trimming tools. The chromium plate on the shoes 87 has excellent wearing qualities and the panels slide freely over it.

Each roller 88 is rotatively mounted on a transverse shaft 90. Each shaft 90 is carried by a bell crank arm 91 mounted on a pivot 92 which is supported by a forked bracket 93. Each forked bracket 93 is mounted on one of the table plates 23. The upper end portion of each bell crank arm 91 is connected with a tension spring 94 which yieldingly urges the hold down roller 88 carried by the bell crank arm down on the panels. One end of each spring 94 is connected with an angle clip 95 which is rigidly supported by the adjacent forked bracket 93.

A suction boot 96 is provided above each rotating tool 75 and 76 whereby dust cuttings and chips may be removed by suction.

The carriage 55 has a bracket member 97 fixedly connected therewith by two transverse bolts 98 and 99. The bracket member 97 is U shape and has two parallel arms 100 and 101 positioned respectively above and below the plane of the table plates 23. The arm 100 is spaced a substantial distance above the top plane of the carriage and has a forked end portion 102 which cooperates in supporting panel hold down means.

The panel hold down means, Fig. 3, comprises a pressure plate 103 to which is attached a panel engaging pad 104 of resilient but fairly solid material, such as fairly firm rubber. The pressure plate 103 is connected by a transverse pivot member 105 with a downwardly extending bracket 106. This pivotal connection provides self leveling adjustment of the plate 103 as respects the panel which the pad 104 engages. Preferably four compression springs 107, Figs. 3, 4 and 6, are provided between the plate 103 and bracket arm 100 at the respective sides of the pivot 105 to hold the presser plate 103 approximately level when it is not in engagement with a panel. Preferably rods 108 are used to help support and prevent displacement of the springs 107. Two tension springs 109, Figs. 1, 3, 4 and 6, each have their lower ends connected with the pivot member 105 and their upper ends connected with an angle plate 110 which is secured to the bracket arm 100. The tension springs 109 thus exert a lift on the presser plate 103 and this lifting force is communicated by the bracket 106 to a lever arm 115 to which the upper end of said bracket 106 is secured by rivets 111. The tension springs 109, operating counter to the springs 107, prevent the presser plate from dropping down and prevent lost motion in the same.

The end of the lever 115 shown at the left in Figs. 1, 2 and 3, is connected by an angle bracket 116 and a two part mounting means 117 and a transverse pivot member 118 with the tip portion of the forked end 102 of the top bracket arm 100. The end of the lever 115 shown at the right in Figs. 1, 2 and 3 is provided with two rollers 114. These rollers 114 cooperate with track and shifter means hereinafter described to hold the plate 103 with pad 104 down on a panel while the carriage is moving toward the right and to hold said plate 103 and pad 104 clear of all panels while the carriage is moving toward the left. The track and shifter means is supported above the table plates 23 by a rigid frame comprising four upright corner members 119, two transversely extending end bars 120 and 121 and two longitudinally extending spaced apart parallel side bars 122.

Two longitudinally extending horizontal track members 123, Figs. 1, 2, 3 and 4, of duplicate construction, are rigidly secured to the side bars 122. Each track member 123, Fig. 3, has a straight upper track surface 124 and a straight lower track surface 125 and has an inclined lower track surface 126 at the end shown at the left and an inclined upper track surface at the end shown at the right. The rollers 114 cooperate with the track members 123 to hold the presser plate down on the panels while the cut is being made and to hold said presser plate elevated above the path of the panels as the carriage moves to the left, Fig. 3.

Two forked shifter members 128, Figs. 1, 2 and 3, of duplicate construction, are each mounted on a pivot 129 on one of the side bars 122 adjacent the cross bar 120. A tension spring 130 supported by a bracket 131 of inverted J shape yieldingly urges the forked end portion of each shifter member 128 downwardly. A stop member 132, rigid with each shifter member 128, is positioned to engage with the adjacent frame bar 122 to limit this downward movement of the forked end portion of the shifter member 128. The forked end of each shifter member 128 has a longitudinally extending notch 133 to receive one of the rollers 114 on the lever arm 115. The arm 134 of each shifter member 128 above the notch 133 has a downwardly facing inclined track surface 135. The arm 136 of each shifter member 128 below the notch 133 has an upwardly facing inclined track surface 137. The uppermost shifter member arm 134 is longer than the lower arm 136.

Two other forked shifter members 140, of duplicate construction and shown at the right in Fig. 3, are pivotally connected by pins 141 with angle brackets 142 which are secured to the frame bar 121. A tension spring 143 supported by a bracket 144 is connected with the forked shifter member 140 and yieldingly urges the forked end portion of the same upwardly against a stop member 145. The forked end portion of each shifter member 140 has a roller receiving notch 146 and has an upper arm 147 provided with a downwardly facing inclined track surface 148 and has a lower arm 149 provided with an upwardly facing inclined track surface 150. The lowermost arm 149 is longer than the uppermost arm 147 of the shifter member 140.

When the carriage 55 and parts connected therewith are in a retracted position, as shown in Fig. 3, the rollers 114 will be in the notches 146 of the shifter members 140 and the tension of the springs 143 will hold the presser plate 103 in a partially raised position with the pad 104 spaced more than the thickness of a panel 31 above the adjacent surface of the carriage 55. As the carriage is moved to the left from the position shown in Fig. 3 the rollers 114 will first roll up the inclined track surfaces 127, thereby further elevating the pressure plate 103, 104, and will then travel along the upper track surfaces 124 of the tracks 123. As the carriage 55 and parts connected therewith move in this direction the extractor plate 59 and pawl 61 will be moving under the stack of panels in the hopper and plate 59 and straight edge 70 will also be moving toward the hopper under a panel which was advanced into the machine on the previous excursion of the carriage 55. As the carriage 55 nears the end of its movement to the left the rollers 114 will engage with the inclined track surfaces 135 of shifter arms 134 and lift the forked end portions of the shifter members 128 and will then drop off of the track members 123. This dropping of the rollers 114 and resultant lowering of the lever 115 and pressure plate 103, 104 will be accelerated by the resilient force of the springs 130. Also by the time the rollers 114 have dropped off of the ends of the tracks 123, or shortly thereafter, the pawl 61 will have cleared the stack of panels and snapped up into a position to engage with the lowermost panel of the stack and the previously advanced panel will have dropped down onto the carriage 55 ahead of the straight edge 70. The direction of travel of the carriage and parts connected therewith is then automatically reversed. As the carriage moves to the right, Fig. 11, the straight edge 70 will engage with and properly position the previously advanced panel and the rollers 114 will engage with and be depressed by the inclined track surfaces 126 of track members 123. This will clamp the presser member 103, 104 down on said previously advanced panel. Also the pawl 61 will begin to advance the lowermost panel in the stack, as shown in Fig. 11. Upon further movement to the right of the carriage mechanism the rollers 114 will follow the lower track surfaces 125 and the panel will be securely held while it is being edge trimmed by the rotating tools 75 and 76.

As the carriage and parts connected therewith approach the position in which they are shown in Fig. 3 the rollers 114 will engage with the inclined track surface 150 of the shifter member 140 and angularly move the forked end portion of said shifter member 140 downwardly. Then, after the panel which is being trimmed has cleared the cutters 75 and 76, the rollers 114 will pass beyond the end of the track members 123 shown at the right in Fig. 3 and the presser member 103, 104 will be snapped up into a raised position and release the panel. The edged panel is then discharged transversely to one side of the machine by an L-shaped kick-out member 151, which will now be described.

The kick-out member 151, Figs. 2 and 14, is supported by two parallel spaced apart bars 152 and 153 of equal length, each having one end portion connected by a pivot member 154 with the kick-out member 151 and the other end connected by a pivot 155 with a block 157 which is rigid with the machine frame. The bars 152 and 153 provide parallel movement insuring that a kick-out arm 158 of the kick-out member 151 will always be moved parallel to the adjacent edge of a trimmed panel 31, Fig. 14, and will contact the panel edge squarely thus avoiding damage to the edge of the panel and insuring uniform delivery of the panels. The kick-out arm 158 operates under a guide and hold down bar 159. Two tension springs 160, each having one end connected by an eye bolt 161 with the bar 152 and the other end connected by anchor means 162 with one of the table plates 23, are provided to impart movement to the kick-out member. Stop members 156 are provided in the path of the bar 152 to limit the movement of the kick-out member 151 toward the work and prevent it from interfering with movement of the carriage.

Devices are provided to move the kick-out member 151 outwardly and then release it at the proper time in the cycle to discharge the panels after the trimming of two edges has been completed. These devices comprise a spring steel trip cam 163 secured by an angle bracket 163' to the side of the bracket arm 100 adjacent the kick-out member. The trip cam 163 has a straight track portion 164 parallel to and spaced outwardly from the adjacent face of the arm 100 and has an inclined resilient cam element 165 integral with the end portion of the straight track part 164 and which is shown at the right in Figs. 2 and 14. The cam element 165 is inclined toward the bracket arm 100 but is sufficiently resilient so that it can be moved outwardly therefrom, see dot and dash lines Fig. 14. An escape bar 166 is secured to the parallel bar 153 and extends toward the trip cam 163. An upwardly extending end portion 167 of the escape bar 166 is positioned for engagement by the track portion 164 and resilient cam element 165 of the trip cam 163.

When the carriage and parts connected therewith are in a position approximately as shown in Fig. 2 preparatory to moving a panel past the driven tools 75 and 76 the escape bar 166, 167 will be to the right of the resilient cam 165. As the carriage and parts connected therewith are moved to the right, Fig. 2, the cam 165 will move the kick-out member 151 outwardly and this will tension the springs 160. The straight track portion 164 will then hold the kick-out member out in a position as shown in Fig. 14 until after the panel is trimmed and released by the pressure member 103, 104. After this has occurred the upstanding portion 167 of the escape bar 166 will be released by the end 169 of the straight track part 164 and the kick-out member 151 will be snapped toward the carriage and will eject the panel. As the carriage and parts connected therewith move from right to left, Figs. 1 and 14, the upstanding end portion 167 of the escape bar 166 will be between the straight track portion 164 and adjacent bracket arm 100 and the inclined resilient cam 165 will be sprung outwardly as it engages with and passes the escape bar part 167 and when clear will spring back into the position shown in Figs. 2 and 14 preparatory to the next cycle of operation of the kick-out member.

The edged panels are ejected uniformly in a sidewise direction by the kick-out means and are stopped in such a manner that they will form a substantially even and uniform stack which can be handled as a unit and turned ninety degrees and put back into the hopper in case only two edges of the panels in the stack have been trimmed. One means for stopping the panels so that they will stack evenly is to provide two or more hanging or suspended belts of flexible material for them to strike against. These suspended belts may be of the usual flat type commonly used on pulleys.

Hydraulic mechanism is provided for reciprocatively moving the carriage 55 and parts connected therewith. Parts of this hydraulic mechanism are shown in Figs. 1, 2, 3 and 4 and Fig. 5 shows the same schematically. This carriage moving means includes automatic controls and comprises the previously mentioned reservoir 25, motor 27 and pump 28. The pump 28 has a suction intake conduit 175 and pressure discharge conduit 176 connected therewith. The intake conduit 175 communicates with the reservoir 25. The discharge conduit 176 communicates with a pressure regulating and relief valve 177. A return conduit or by-pass pipe 178 connects the pressure regulating and relief valve 177 with the reservoir 25. A pressure supply conduit 179 having a manually controlled speed regulating valve 180 therein connects the valve 177 with a piston valve 181 which functions like a four way valve. A conduit 182 connects the piston valve 181 with the return line conduit 178. Two other conduits 183 and 184 connect the piston valve 181 with fittings 185 and 186 respectively, which receive the respective ends of a main operating cylinder 187. Fittings 185 and 186 are supported on a longitudinally extending frame bar 174. The main operating cylinder 187 is relatively long and has a piston 188 which is connected by a piston rod 189 with fixed lugs 190 on the bracket 97 which moves the carriage mechanism.

A pilot valve 191 controls the operation of the piston valve 181. The pilot valve 191 is connected by two small conduits 192 and 193 with the respective end portions of the piston valve 181. Also the pilot valve 191 is connected by a conduit 194 with the return conduit 178 and said pilot valve is further connected by a conduit 173 with the pressure supply conduit 179. A start and stop valve 196 is connected by a conduit 195 with the pressure supply conduit 179 and by another conduit 197 with the pressure regulating and relief valve 177.

The pilot valve 191 has two valve operating levers 198 and 198' positioned at different levels. This pilot valve 191 is supported from one of the overhead frame bars 122 by bracket means 199, Figs. 1, 2 and 7. The valve operating levers 198 and 198' extend into the path of movement respectively of two valve actuating members 201 and 202 which are carried by a bar 203 and are positioned at different levels. The bar 203 is attached to the bracket arm 100 by an angle bracket means 204 and moves with the carriage.

The operation of the hydraulic carriage moving means is as follows: The pump 28 may run continuously during the time the machine is being operated and excess oil which is pumped will be returned through the valve 177 and conduit 178 to the reservoir 25. The start and stop valve 196 is manually operated and is used to start and stop operation of the hydraulic mechanism. The pilot valve 191 is a four way valve operated by the members 201 and 202 which are carried by the carriage and contact the respective levers 198 and 198' as the carriage nears the ends of its stroke. Each time the pilot valve 191 is operated it reverses connection of the piston valve 181 as respects inlet and exhaust of fluid. Each time the piston valve 181 is thus operated by the pilot valve it reverses connections, as respects fluid pressure inlet and exhaust from the main operating cylinder 187. The hydraulic means thus provides for continuous reciprocation of the carriage and parts connected therewith when the machine is in use.

The foregoing description and accompanying drawings clearly disclose a preferred embodiment of this invention but it will be understood that this disclosure is merely illustrative and that such changes in the invention may be made as are fairly within the scope and spirit of the following claims.

We claim:

1. In a machine for edge trimming, sizing and accurately squaring flat panels which have been roughly sized and squared, a horizontal table; a reciprocably movable carriage supported on said table; panel engaging means carried by said carriage operable to intermittently move panels in one direction; two spaced apart rotatively driven cutting tools supported by said table alongside of the path of movement of the panels and positioned to engage with and edge trim two opposed edges of the panels as the panels are moved between the tools; spring actuated panel kick-out means; a trip cam secured to and movable with the carriage; and an escape bar secured to the kick-out means and positioned in the path of movement of the trip cam, whereby the trip cam will contact the escape bar and retract the kick-out means at the beginning of panel advancing movement of the carriage and will hold the kick-out means retracted while panels are in engagement with the rotatively driven tools and will release the escape bar to rapidly transversely discharge the panels after they have passed beyond the rotatively driven tools.

2. The apparatus as claimed in claim 1 in which the panels rest on the carriage as they are being moved past the tools and in which panel hold-down means which is carried by and moves with the carriage is provided to hold the panels down on the carriage while they are passing the driven cutting tools.

3. In a machine for edge trimming, sizing and squaring flat panels, a table; two rotatively driven horizontal cutter head type panel edging tools positioned in transversely spaced apart relation and extending above the plane of said table; a carriage on the table movable longitudinally thereof in a straight line between said tools, said carriage having an upper panel supporting surface; carriage reciprocating devices connected with said carriage; panel hopper means adapted to support a stack of panels to be edge trimmed; an extractor plate attached to said carriage and reciprocable therewith from a position under a stack of panels in the hopper to a position clear of said stack of panels, said extractor plate having an upper panel supporting surface positioned in a plane above the plane of the panel supporting surface of the carriage; a spring pressed pawl on said extractor plate engageable with the lowermost panel of the stack to extract said lowermost panel from the stack each time the extractor plate is withdrawn from under the stack; and a straight edge carried by the extractor plate and carriage and positioned at the location where the change of level between the panel supporting surfaces of the extractor plate and carriage occurs and operable to engage with and square up a previously extracted panel and move the same past said tools each time the extractor plate is withdrawn from the stack of panels.

4. The apparatus as claimed in claim 3 in which resilient panel hold down means is positioned outside of but adjacent to the hopper above the path of the advancing panels, whereby panels withdrawn from the hopper are yieldingly urged downwardly onto the extractor plate and carriage.

5. In a machine for edge trimming and accurately sizing and squaring flat panels which have been roughly sized and squared, a table, two cutter head type panel edging tools rotatively mounted in transversely spaced apart relation on axes perpendicular to the table and extending above the plane of the table; a panel hopper adapted to support a stack of panels adjacent one end of said table; panel supporting and feeding carriage means reciprocably movable between said driven tools, parts of said carriage means being operable beneath a stack of panels in said hopper; a pawl on said carriage means engageable with the lowermost panel of the stack to withdraw the lowermost panel each time the carriage means is withdrawn from beneath the stack; straight edge means carried by said carriage means and spaced from said pawl and operable to engage with and square up a previously withdrawn panel and move the same past the panel edging tools each time a panel is withdrawn from beneath said stack, said carriage means having a panel supporting upper surface positioned beyond said straight edge means in the direction of feed of the panels; a presser plate movably supported above the carriage means; a presser plate moving lever connected with said presser plate; fixed lever actuating track means provided adjacent the carriage, whereby the presser plate is moved toward and away from the carriage to selectively clamp and release a panel on the carriage and resilient panel hold down means positioned above the carriage means and adjacent to the hopper, whereby panels withdrawn from the hopper pass under the resilient hold down means; and a resiliently supported hold down roller adjacent each edge trimming tool in the path of the moving panels.

6. The apparatus as claimed in claim 5 in which a presser plate is movably supported above the carriage means and presser plate moving devices are connected with said presser plate, whereby the presser plate is held in firm engagement with a panel on the carriage means while the panel is being moved past the edge trimming tools.

7. In a machine for edge trimming and accurately sizing and squaring flat panels which have been roughly sized and squared, a horizontal table, two rotatively driven edge trimming tools positioned in transversely spaced apart relation on said table and extending above the plane of the table and having axes at right angles to the table; reciprocating carriage means operable to move panels in a straight line between said tools, whereby opposed edges of the panels will be trimmed by the tools; an arm rigid with said carriage means and spaced above the same; a presser plate supported by said arm for movement toward and away from said carriage means; a presser plate moving lever connected with said presser plate; a roller carried by said lever remote from the presser plate; and a fixed track member positioned for engagement by said roller, said track member having two roller engaging track surfaces, whereby said presser plate is held in a panel engaging position by one track surface while the carriage is moving in one direction and is held in a retracted position by the other track surface while the carriage is moving in an opposite direction.

8. The apparatus as claimed in claim 7 in which at least one pivotally mounted spring actuated forked roller receiving bracket is provided adjacent each end of said track member and cooperates in the transfer of said roller from one track surface of said track member to the other substantially at the ends of the carriage stroke.

References Cited in the file of this patent

UNITED STATES PATENTS

| | | |
|---|---|---|
| 482,917 | Dix | Sept. 20, 1892 |
| 726,329 | Morgan | Apr. 28, 1903 |
| 1,066,577 | Bertsch | July 8, 1913 |
| 1,799,958 | Cranston | Apr. 7, 1931 |
| 2,031,385 | Peterman et al. | Feb. 18, 1936 |
| 2,135,755 | Lawshe | Nov. 8, 1938 |
| 2,207,782 | Carlson | July 16, 1940 |
| 2,270,871 | Felber | Jan. 27, 1942 |
| 2,562,728 | Melby | July 31, 1951 |
| 2,586,536 | Haller | Feb. 19, 1952 |